United States Patent [19]

Krayenhagen

[11] Patent Number: 5,547,449
[45] Date of Patent: Aug. 20, 1996

[54] FLEXIBLE ROLL

[76] Inventor: Dan Krayenhagen, P.O. Box 411248, Charlotte, N.C. 28241-1248

[21] Appl. No.: 403,490

[22] Filed: Mar. 14, 1995

[51] Int. Cl.⁶ .................................................. B21B 27/00
[52] U.S. Cl. .......................... 492/44; 492/20; 492/40; 26/101
[58] Field of Search ............................. 492/44, 20, 40; 26/101

[56] References Cited

U.S. PATENT DOCUMENTS

| | | | |
|---|---|---|---|
| 331,328 | 12/1885 | Randall. | |
| 727,838 | 5/1903 | Quigley et al.. | |
| 798,072 | 8/1905 | Quigley et al.. | |
| 1,271,194 | 7/1918 | Meyer. | |
| 2,429,670 | 10/1947 | Crews | 492/44 |
| 2,501,630 | 3/1950 | Goulding | 492/40 X |
| 2,960,749 | 11/1960 | Robertson | 492/44 X |
| 2,960,753 | 11/1960 | Robertson | 492/44 |
| 3,604,087 | 9/1971 | Beck. | |
| 3,791,731 | 2/1974 | Mihalik. | |
| 4,149,303 | 4/1979 | Appenzeller. | |
| 4,752,145 | 6/1988 | Schelshorn et al. | 492/44 X |

FOREIGN PATENT DOCUMENTS

| | | | |
|---|---|---|---|
| 78602 | 2/1950 | Czechoslovakia | 492/44 |
| 836026 | 1/1939 | France | 492/44 |

*Primary Examiner*—Carl J. Arbes
*Attorney, Agent, or Firm*—Shefte, Pinckney & Sawyer

[57] ABSTRACT

A flexible roll for applying pressure to a substrate comprising a center rod extending between two end journals, and a wound helical coil attached to such journals with a diametric spacing from the center rod so that the coil will assume a convex bowed configuration and contact the center rod at the middle portion thereof.

4 Claims, 2 Drawing Sheets

FLEXIBLE ROLL

BACKGROUND OF THE INVENTION

This invention relates generally to flexible rolls and particularly rolls for applying pressure to a substrate passing beneath and in contact with such There are a number of different applications in which flexible rolls or other mechanical devices are utilized in processing equipment to press downwardly onto the upper surface of a material being processed for the purpose of applying weight or pressure to such material. For example, in equipment used to make corrugated cardboard, the skins and the intermediate web of the cardboard are brought together and moved across the heated surfaces of a plurality of steam boxes so that the heat will cause an applied adhesive to become tacky, while pressure is applied simultaneously to the top surface of the top skin components together with sufficient force to cause bonding thereof. It is common practice to use relatively heavy steel rolls for this purpose, and the rolls are mounted for free vertical movement above the substrate so the weight of the roll itself provides the bonding pressure to the substrate, and the roll rotate freely as the roll engages the substrate.

However, in many such applications of pressure-applying rolls, the width of the substrate is quite large (e.g., 87 inches in the case of a typical cardboard making machine of the type described above and, therefore, the span of the pressure rolls extending across this width must also be quite large. Moreover, the roll must extend across the entire width of the substrate and, therefore, the roll can only be supported at its ends. As a result, when the surface that supports the moving substrate (e.g., the upper surface of the steam boxes) assumes a bowed configuration because of the substantial span thereof, a straight, solid steel roll tends to have less of a bow across its span and the roll applies too much pressure to the substrate at the outer widthwise ends thereof and too little pressure along the rest of the width. In some applications, this can result in a substantial and undesirable gap between the heated surface of the steam box and the surface of the substrate that can affect the operation and/or efficiency of the equipment. For example, a gap of only ⅛ inch between the lower skin and the surface of the steam box over which it travels can result in a loss of about half of the heat generated by the steam box.

In an effort to overcome this problem, pressure rolls of the aforementioned type have been covered with some form of resilient material (e.g., rubber) to add resiliency to the surface of the roll, and while this may improve to some extent the uniformity at which the pressure is applied to the substrate, there is still a significant difference between the pressure applied at the ends of the roll and the pressure applied at the center.

Also, in some cardboard making equipment, rolls have been replaced with a plurality of pressure applying units that are mounted on individual support bars and arranged in side-by-side relation along a portion of the traveling length of the substrate. Each such unit includes a pair of flat plates mounted in spaced parallel relation to one another by a plurality of flexible arms that permit some relative vertical movement of the lower plate or shoe, which is in contact with the upper moving surface of the substrate. Again, this arrangement improves to some extent the uniformity at which pressure is applied to the substrate, but these units are relatively expensive and because the surfaces of each shoe is flat, it is still not possible for such surface to conform closely to the inherent bowing and undulations of the upper surface of the moving substrate.

Finally, it is generally known that rolls can be formed of helically wound metal to provide the roll with particular features suitable for special applications. In many such rolls, the wound outer surface is supported directly on a core so as to have little longitudinal flexibility, as disclosed for example in U.S. Pat. Nos. 798,072; 3,604,087; 3,791,731; and 4,149,303. In other known rolls of this type, the length of the roll is relatively short, at least relative to the resiliency of the wound outer portion of the roll and, therefore, the wound outer portion maintains essentially a cylindrical configuration along its entire length, as disclosed for example in U.S. Pat. Nos. 331,328; 727,838; and 1,271,194.

The present invention provides a roll which overcomes to a substantial extent the aforesaid drawbacks of known arrangements for applying pressure to a substrate and offers a simple, relatively inexpensive and effective pressure applying roll.

SUMMARY OF THE INVENTION

The present invention provides an elongated flexible roll for applying pressure to a substrate passing beneath and in contact therewith, and it comprises a longitudinally extending center rod having a predetermined diameter and a pair of journals mounted at each end of the center rod to define a predetermined length of the rod therebetween, with each of the journals being larger than the center roll. A wound helical coil formed of metal and having an internal diameter greater than the diameter of the center rod by a predetermined amount is attached at its ends to the journals, respectively, so that the center rod is substantially centered with respect to the coil at the journals, the predetermined length of the center rod and the predetermined difference between the diameters being selected so that the weight of the helical coil will result in the helical coil assuming a convex bowed configuration that extends from the journals to the midpoint portion of the center rod with the helical coil being in contact with the center rod only at the middle or central portion thereof, whereby the weight of the helical coil will be applied generally uniformly to the substrate across the extending length of the flexible roll.

In one preferred embodiment of the present invention, the aforesaid predetermined length of the center rod between the journals is about 90 inches, the diameter of the center rod is about 1 inch, the interior diameter of the helical coil is about 1.6 inches, and the outer diameter of the helical coil is about 2.6 inches. In another embodiment, the length is 115 inches, with all other dimensions being approximately the same as in the first embodiment.

DESCRIPTION OF THE PREFERRED EMBODIMENT

Figure 1:
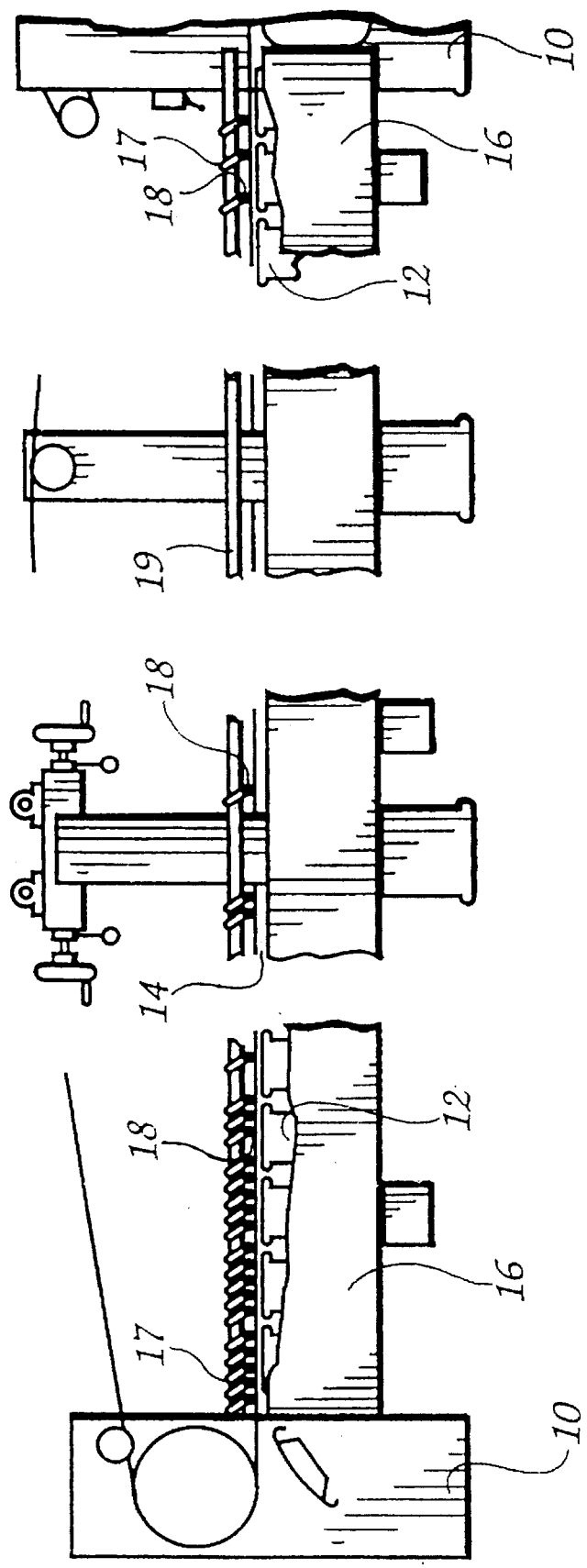
FIG. 1 is a diagrammatic view illustrating a side elevational view of a portion of a conventional cardboard making machine in which one of the rolls of the present invention is being utilized.

Looking now in greater detail at the accompanying drawings, FIG. 1 illustrates, in diagrammatic and schematic form, a portion of apparatus for bringing together two paper skins and an intermediate web and forming these elements into corrugated cardboard. However, it is to be understood that the flexible roll of the present invention is not limited to this particular application.

More specifically, FIG. 1 is a diagrammatic vertical side elevational view through the heating section of a typical cardboard forming apparatus, which is partially broken away, and it illustrates frame members 10 between which a plurality of steam chest 12 extend longitudinally with each steam chest 12 having an upper flat surface across which the combined elements of the corrugated cardboard 14 pass so that the heat generated by the steam chest 12 will activate the adhesive used to bond the elements of the corrugated cardboard 14 together. The steam chests 12 are mounted in side frames 16 and a plurality of flexible rolls 18 according to the present invention are carried above the upper surface of the steam chests 12 by conventional individual roll lift levers 17 which, in turn, are mounted collectively on a conventional lifting frame 19, whereby each flexible roll 18 can be individually raised off the upper surface of the cardboard 14 or all of the flexible rolls 18 can be simultaneously lifted off of the cardboard 14 using the lifting frame 19. The flexible rolls 18 are journaled at their ends in the frame 10 and extend across the width of the apparatus in spaced relation to the upper surface of the steam chest 12 so as to exert a downward pressure on the corrugated cardboard 14 as it passes across the upper surfaces of the steam chests 12 to thereby press the elements of the corrugated cardboard 14 together and cause bonding thereof by the adhesive applied to the elements. In apparatus of this type, it is typical for the flexible rolls 18 to have an extending length of 90 inches or, in some cases, a length of 115 inches.

Figure 4:
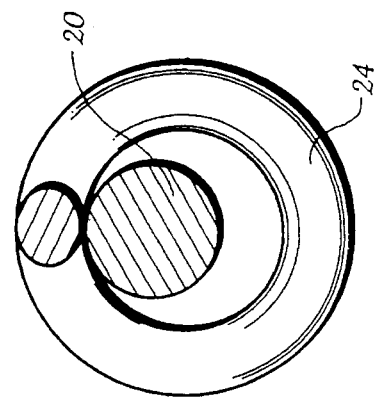
FIG. 4 is a vertical section view similar to FIG. 3, except taken through the midportion of the flexible roll.
Figure 3:
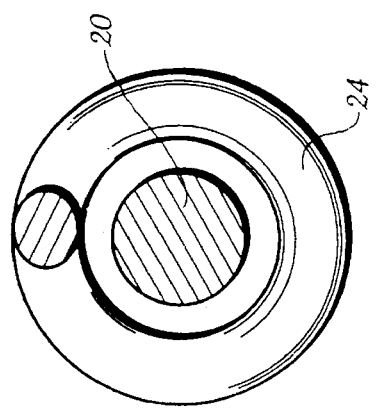
FIG. 3 is a vertical section view taken through the flexible roll illustrated in FIG. 2 approximately at the point where the round coil is attached to the one of the end journals.
Figure 2:
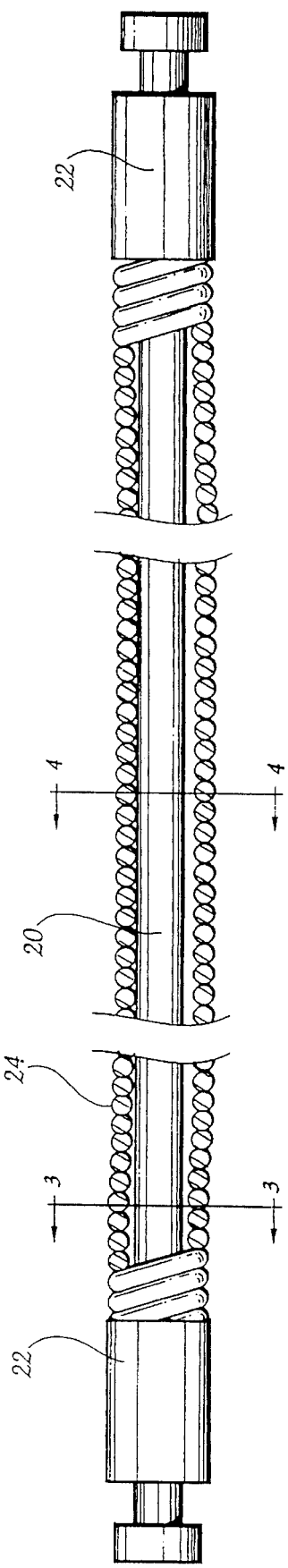
FIG. 2 is a side elevational view of the flexible roll of the present invention, partially broken away to better illustrate the construction of the roll.

The flexible roll 18 itself is best illustrated in FIGS. 2–4, and it includes a longitudinally extending center rod 20 which has a predetermined diameter and a pair of journals 22 mounted, respectively, at each end of the center rod 20 so as to define a predetermined length of the center rod 20 therebetween. Each of the journals 22 is significantly larger than the center rod 20 as best seen in FIG. 2, and a wound helical coil 24 formed of metal is attached at its ends, respectively, to the journals 22, and the wound helical coil 24 has a diameter that is greater than the aforesaid predetermined diameter of the center rod 20. The difference between the two diameters is selected so that it, in combination with the predetermined length of the center rod 20 between the journals 22, is such that the weight of the wound helical coil 24 will result in such wound helical coil 24 assuming a convex bowed configuration that extends from the journals 22 to the midpoint portion of the center rod 20 as best seen in FIG. 2. Thus, at the respective ends of the center rod 20, the wound helical coil 24 is essentially co-axially disposed with respect thereto so that there is a uniform diametric spacing between the inner surface of the wound helical coil 24 and the exterior surface of the center rod 20 as illustrated in FIG. 3. However, because of the significant span of the wound helical coil 24 and the weight thereof, the middle portion of the wound helical coil 24 is in contact with the center rod 20 only at its midpoint portion thereof, as best illustrated in FIG. 4.

By virtue of this unique relationship of the several elements of the flexible roll 18, when the flexible roll is positioned above a moving substrate, such as the corrugated cardboard shown in FIG. 1, and is permitted to move freely in a vertical direction above the substrate, it will be apparent that the weight of the bowed wound helical coil 24 will exert the greatest downward pressure on the substrate at the longitudinal midportion thereof because the substrate acts to lift the sagging center portion of the wound helical coil 24 upwardly toward the center rod 20 and the weight of the wound helical coil 24 imposed on the substrate gradually decreases along the longitudinal extent of the flexible roll 24 until there is little or no weight applied to the substrate at the end portions of the wound helical coil 24 which are attached to the journals 22. As noted above, in known solid steel rods which are used in applications having a substantial longitudinal extent, the weight of such rolls is distributed unevenly, with the major portion of weight being applied near the extending ends of the roll rather than at the center of the roll where it is most needed. By contrast, the weight applied to the substrate by the flexible roll of the present invention is distributed substantially uniformly along the extending length of the flexible roll.

In one commercial embodiment of the flexible roll of the present invention which can be effectively used in apparatus for making corrugated cardboard as described above, the length of the flexible roll between the journals 20 is 90 inches. The solid center rod 20 has a diameter of 1 inch and the wound helical coil 24 is preferably formed of a ½ inch diameter chrome vanadium steel rod that is tightly wound into a coil having a 2.6 inch outer diameter and a 1.6 inch inner diameter. Accordingly, at the respective ends of the flexible roll, as illustrated in FIG. 3, the wound helical coil 24 has a uniform diametric spacing from the center rod of approximately ½ inch. The combination of the selected length of the flexible roll, the weight and resiliency of the wound helical coil 24, and the selected difference between the diameters of the center rod 20 and the wound helical coil 24 to produce the diametric spacing therebetween all results in the wound helical coil assuming the convex bowed configuration described above with the wound helical coil 24 being in contact with the center rod 20 only at the midpoint portion thereof so that the weight of the wound helical coil will be applied generally uniformly to the corrugated cardboard substrate passing beneath the flexible roll. It has also been found that a flexible roll having the specific dimensions set forth above can also be used in apparatus for forming corrugated cardboard having an even greater width and in that application, the length of the flexible roll between the journals 22 is 115 inches rather than 90 inches.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An elongated flexible roll for applying pressure to a substrate passing beneath and in contact therewith, said roll comprising:

(a) a longitudinally extending center rod having a predetermined diameter;

(b) a pair of journals mounted at each end of said center rod to define a predetermined length of said rod therebetween, each of said journals having a size larger than said center rod; and (c) a wound helical coil formed of metal and having an internal diameter greater than said diameter of said center rod by a predetermined amount, said helical coil being attached at its ends to said journals, respectively, so that said center rod is substantially centered with respect to said coil at said journals, said predetermined length of said center rod and said predetermined difference between said diameters being selected so that the weight of said helical coil will result in said helical coil assuming a convex bowed configuration that extends from said journals to the midpoint portion of said center rod with the helical coil being in contact with said center rod only at said midpoint portion thereof, whereby said weight of said helical coil will be applied generally uniformly to said substrate across the extending length of said flexible roll.

2. An elongated flexible roll as defined in claim 1, wherein said predetermined length of said center rod between said journals is at least 150 times greater than said difference between said diameters of said coil and said center rod.

3. An elongated flexible roll as defined in claim 1, wherein said predetermined length of said center rod between said journals is about 90 inches, wherein the diameter of said center rod is about 1 inch, wherein the interior diameter of said helical coil is about 1.6 inch, and wherein the outer diameter of said helical coil is about 2.6 inches.

4. An elongated flexible roll as defined in claim 1, wherein said predetermined length of said center rod between said journals is about 115 inches, wherein the diameter of said center rod is about 1 inch, wherein the interior diameter of said helical coil is about 1.6 inch, and wherein the outer diameter of said helical coil is about 2.6 inches.

* * * * *